(12) United States Patent
Lee

(10) Patent No.: US 6,253,668 B1
(45) Date of Patent: Jul. 3, 2001

(54) COMPOUND TYPE KIMCHI STORAGE DEVICE

(75) Inventor: Young-gil Lee, Chungcheongnam-do (KR)

(73) Assignee: Mando Climate Control Corporation (KR)

( * ) Notice: Subject to any disclaimer, the term of this patent is extended or adjusted under 35 U.S.C. 154(b) by 0 days.

(21) Appl. No.: 09/650,169

(22) Filed: Aug. 29, 2000

(30) Foreign Application Priority Data

Feb. 22, 2000 (KR) .................................................. 00-8604

(51) Int. Cl.[7] .............................. A23L 1/00; F25B 1/00; F25B 29/00; C12H 1/00
(52) U.S. Cl. ............................ 99/468; 099/470; 099/483; 099/486; 062/117; 062/197; 165/30; 165/206; 435/286.1; 435/289.1; 435/300.1
(58) Field of Search .................................. 099/276, 331, 099/451, 467–472, 483, 486, 493, 506, 534, 535, 516; 062/229, 157, 187, 115, 117, 253, 440, 447, 254, DIG. 13, 197–199; 165/30, 64, 206, 263, 48.1; 219/400, 530, 531; 426/49, 52, 615, 231; 435/289–291, 313, 316, 69.1, 172.1, 300.1, 813, 819

(56) References Cited

U.S. PATENT DOCUMENTS

| | | | | |
|---|---|---|---|---|
| 5,142,969 | * | 9/1992 | Chun | 99/468 |
| 5,180,745 | * | 1/1993 | Cayre | 435/69.1 |
| 5,351,745 | * | 10/1994 | Park | 99/470 X |
| 5,398,599 | * | 3/1995 | Woo | 99/483 X |
| 5,421,247 | * | 6/1995 | Shim | 99/468 |
| 5,424,210 | * | 6/1995 | Bae et al. | 435/286.6 |
| 5,456,164 | * | 10/1995 | Bang | 99/486 X |
| 5,458,186 | * | 10/1995 | Lee et al. | 99/486 X |
| 5,470,746 | * | 11/1995 | Kim | 99/493 X |
| 5,477,915 | * | 12/1995 | Park | 99/468 X |
| 5,542,262 | * | 8/1996 | Park | 62/229 |
| 5,555,797 | * | 9/1996 | Chun | 435/286.1 |
| 5,699,674 | * | 12/1997 | Lee et al. | 62/115 |

* cited by examiner

Primary Examiner—Timothy F. Simone
(74) Attorney, Agent, or Firm—Fish & Richardson P.C.

(57) ABSTRACT

The present invention discloses a compound type kimchi storage device including an upper storage tank of an upper open/shut type and a lower storage tank of a front slide open/shut type as storage tanks for storing foods. The kimchi storage device for ripening and storing foods such as kimchi by selectively operating a compressor and a heater, includes: a casing composing an outward form of the device; at least one upper storage tank disposed at the inside of the casing for providing at least one upper storage chamber, an insulating material being filled between the casing and the storage tank; a door disposed at one side of the casing for opening and shutting the upper storage chamber; a drawer-type lower storage tank disposed below the upper storage tank for providing a lower storage chamber, a sidewall being positioned between the upper and lower storage tanks; and a driving chamber positioned adjacently to the lower storage tank, a compressor being installed in the driving chamber.

8 Claims, 6 Drawing Sheets

US 6,253,668 B1

COMPOUND TYPE KIMCHI STORAGE DEVICE

BACKGROUND OF THE INVENTION

1. Field of the Invention

The present invention relates to a compound type kimchi storage device, and in particular to a compound type kimchi storage device that can separately store a variety of foods according to the user's preference, by including an upper storage tank of an upper open/shut type and a lower storage tank of a front slide open/shut type as storage tanks for storing foods, and by respectively controlling an inside temperature of the storage chambers.

2. Description of the Background Art

In general, a kimchi storage device includes a cooling device and a heating device. In order to ripen kimchi, a temperature in a storage chamber is raised by operating a heater that is the heating device. Accordingly, kimchi stored in the storage chamber is ripened.

When kimchi is suitably ripened, the operation of the heater is stopped, and at the same time the cooling device starts to be operated. Thus, a temperature of the storage chamber is adjusted so that taste and freshness of kimchi can be maintained for an extended period of time.

FIG. 1 is a perspective view illustrating a conventional kimchi storage device, and FIG. 2 is a cross-sectional view taken along line A–A' in FIG. 1.

As illustrated in FIG. 1, a door 13 is provided to be opened and shut at an upper portion of a kimchi storage device 10, and a casing 11 composing a main body is disposed below the door 13. The casing 11 includes a storage tank for storing foods. An operating unit 14 is provided at the one-side upper portion of the kimchi storage device 10.

As shown in FIG. 2, the kimchi storage device 10 includes: the outer casing 11; an inner tank 11 disposed at the inside of the casing 11 for providing a storage chamber 12a for refrigerating foods, an insulating material 21 being positioned between the casing 11 and the inner tank 12; the door 13 rotatably disposed at the casing 11 for opening and shutting the storage chamber 12a; and the operating unit 14 adhered to a front surface of the casing for controlling the operation of the kimchi storage device 10. On the basis of a sidewall 15, the inner tank 12 for storing foods is provided at the upper portion of the kimchi storage device 10, and a driving chamber 17 where a compressor 22 is installed is provided at the lower portion thereof.

An evaporator pipe 18 extended from the driving chamber 17 is coiled around the outer circumferential surface of the storage tank 12. Low temperature refrigerants for cooling the air in the storage chamber 12a flow through the evaporator pipe 18 winding around the upper portion of the outer circumferential surface of the storage tank 12. A heater 19 is coiled around the lower portion of the evaporator pipe 18.

On the other hand, a temperature sensor 20 for sensing a temperature in the storage chamber is provided to the evaporator pipe 18 or the outer circumferential surface of the storage tank 12.

In addition, the insulating material 21 is filled between the storage tank 12 and the casing 11 in order to prevent a heat loss of the evaporator pipe 18 winding around the outer portion of the storage tank 12 and the heater 19 positioned therebelow.

A control unit for controlling the whole operation of the kimchi storage device 10 and the compressor 22 driven by a control signal from the control unit for compressing the refrigerants are provided in the driving chamber 17 which is positioned below the sidewall 15. The refrigerants from the compressor 22 are cooled in a condenser 23 through heat exchange with the ambient air, and supplied to the evaporator pipe 18. On the other hand, the temperature sensor 20 disposed at the outer portion of the inner tank 12 is coupled with the control unit.

In the thusly-constituted kimchi storage device 10, in the case that the temperature of the storage chamber 12a sensed by the temperature sensor 20 rises over a reference value due to the internal heat loss or external heat, the control unit transmits the control signal to the compressor 22 according to the signal from the temperature sensor 20. Accordingly, the low temperature refrigerants are provided to the evaporator pipe 18 winding around the outer circumferential surface of the storage tank 12, thereby lowering the temperature of the storage chamber 12a.

As described above, the control unit drives the compressor 22 according to the input signal from the temperature sensor 20, and thus maintains the storage chamber 12a at a constant temperature. In order to ripen foods, the control unit generates heat by transmitting the control signal to the heater 19. As a result, the temperature of the storage chamber 12a is raised, and kimchi starts to be ripened.

However, in the conventional kimchi storage device, for example, when the user intends to store kimchi according to its ripening level after ripening it according to his/her taste, the user has little choice because there are only one or two storage chambers. In addition, it is necessary to store kimchi in the different storage chamber to maintain its ripening state. However, there are few storage chambers, and thus kimchi is stored with other foods. It cannot satisfy the demand of the users. Moreover, the noise is discharged from the compressor in the driving chamber to the front surface of the casing. Also, the noise generated at the time of driving the compressor in the driving chamber is discharged to the front, thereby causing the serious noise.

SUMMARY OF THE INVENTION

Accordingly, it is an object of the present invention to provide a kimchi storage device which can separately store kimchi ripened according to the user's taste and reduce the noise discharged from a driving chamber at the time of driving the device by a storage tank disposed at the front portion of the driving chamber, by further including the storage tank opened and shut toward the upper portion of the device and the front slide open/shut type storage tank sliding toward the front portion of the device.

In order to achieve the above-described object of the present invention, there is provided a kimchi storage device for ripening and storing foods such as kimchi by selectively operating a compressor and a heater, including: a casing composing an outward form of the device; at least one upper storage tank disposed at the inside of the casing for providing at least one upper storage chamber, an insulating material being filled between the casing and the storage tank; a door disposed at one side of the casing for opening and shutting the upper storage chamber; a drawer-type lower storage tank disposed below the upper storage tank for providing a lower storage chamber, a sidewall being positioned between the upper and lower storage tanks; and a driving chamber positioned adjacently to the lower storage tank, a compressor being installed in the driving chamber.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

A compound type kimchi storage device in accordance with a preferred embodiment of the present invention will now be described with reference to the accompanying drawings.

Figure 1:
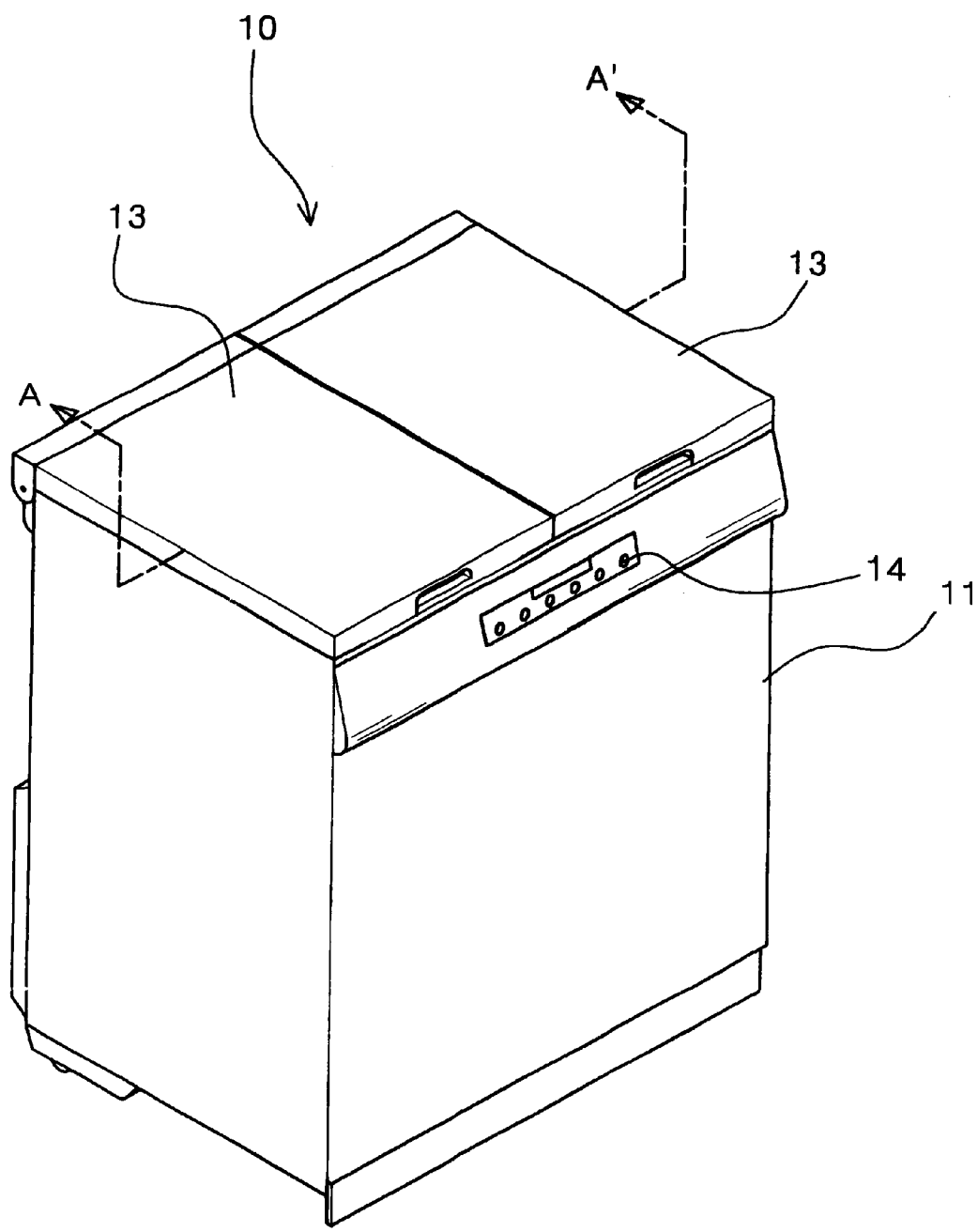
FIG. 1 is a perspective view illustrating a conventional kimchi storage device.
Figure 2:
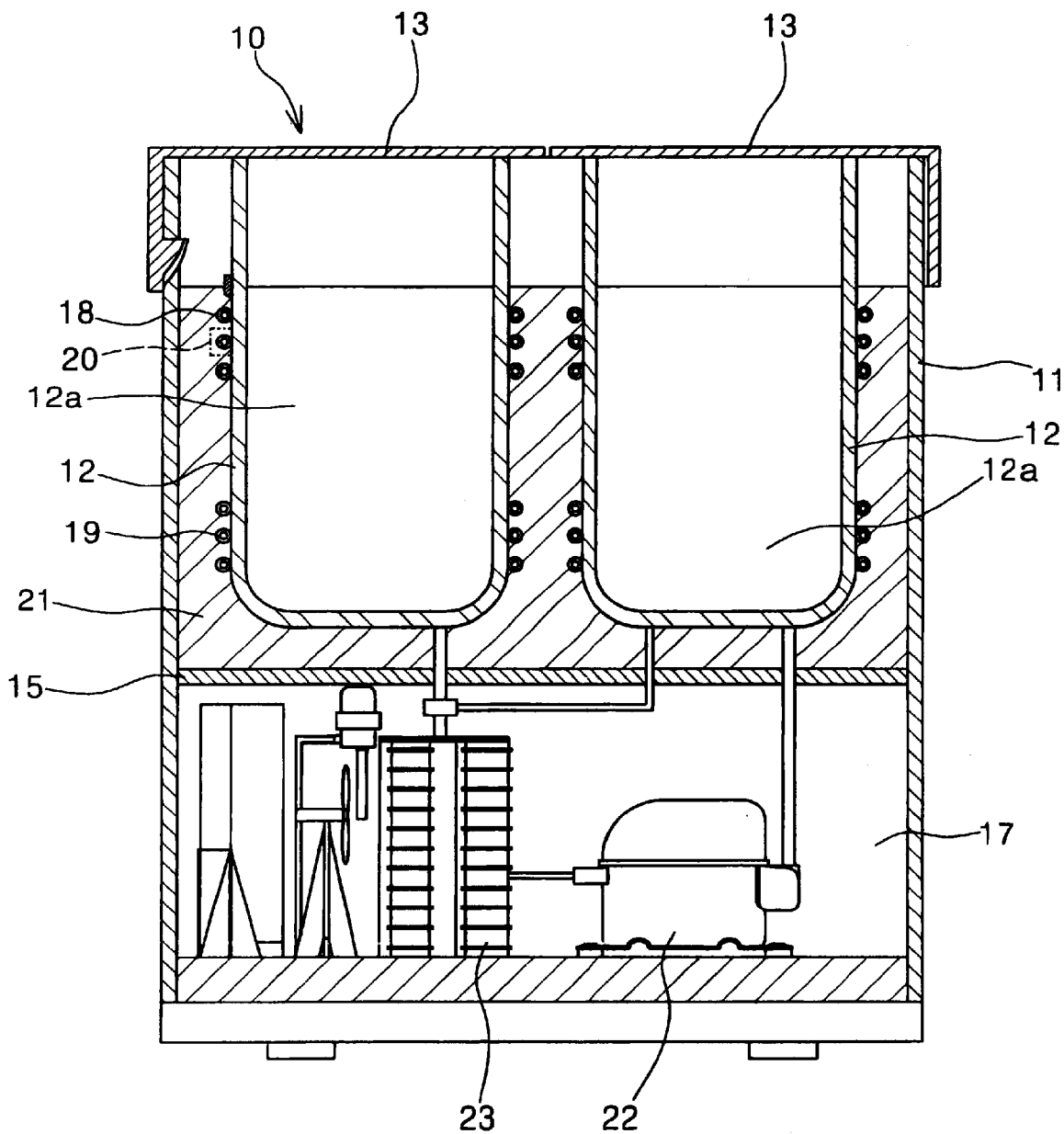
FIG. 2 is a cross-sectional view taken along line A–A' in FIG. 1.
Figure 3:
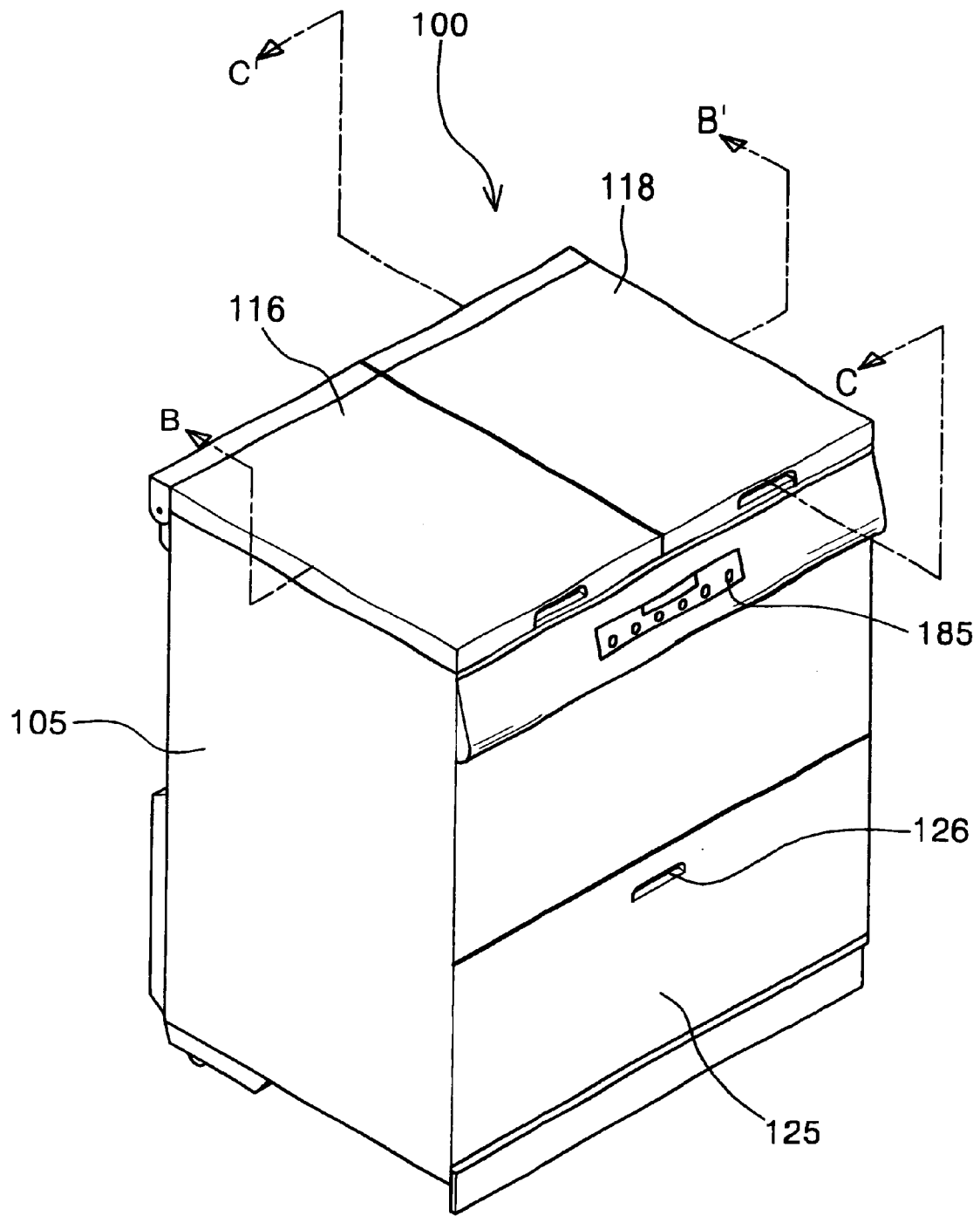
FIG. 3 is a perspective view illustrating a compound type kimchi storage device in accordance with the present invention.
Figure 4:
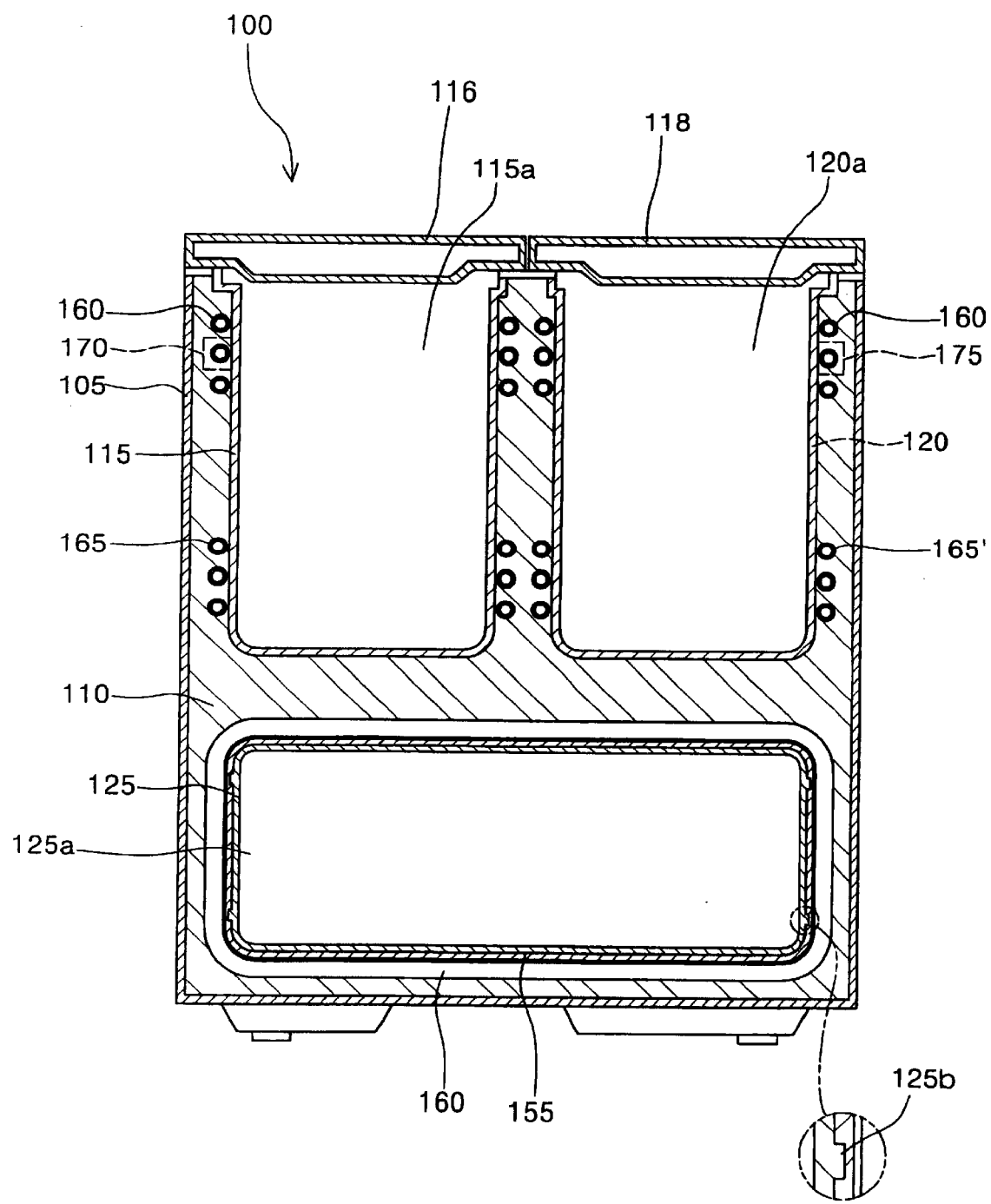
FIG. 4 is a cross-sectional view taken along line B–B' in FIG. 3.
Figure 5:
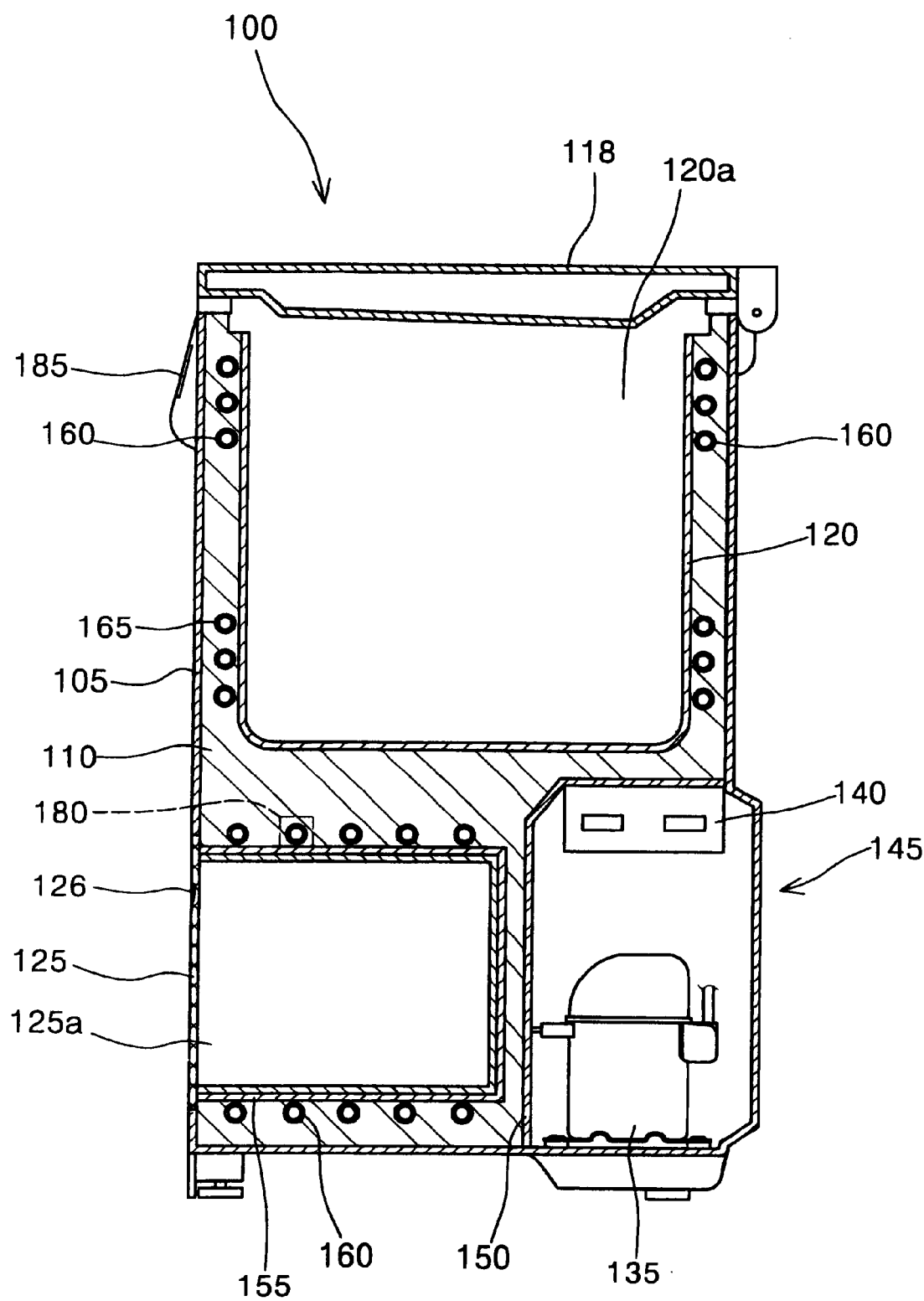
FIG. 5 is a cross-sectional view taken along line C–C' in FIG. 3.

FIG. 3 is a perspective view illustrating the compound type kimchi storage device in accordance with the present invention, FIG. 4 is a cross-sectional view taken along line B–B' in FIG. 3, and FIG. 5 is a cross-sectional view taken along line C–C' in FIG. 3.

As illustrated in FIG. 3, two doors 116, 118 are disposed to be opened and shut at the upper portion of the compound type kimchi storage device 100. First and second upper storage tanks 115, 120 for respectively providing first and second upper storage chambers (115a, 120a in FIG. 4) are disposed below the doors 116, 118. In addition, a front slide open/shut type lower storage tank 125 is slidably installed at a front lower portion of the kimchi storage device 100. A handle 126 is formed at the lower storage tank 125.

Thus, the kimchi storage device 100 in accordance with the present invention include three storage chambers 115a, 120a, 125a. An operating unit 185 is disposed at the front upper portion of the kimchi storage device 100.

Referring to FIGS. 4 and 5, the compound type kimchi storage device 100 according to the present invention includes: a casing 105 composing a main body; the first and second upper storage tanks 115, 120 disposed at the inside of the casing 105 for respectively providing the first and second upper storage chambers 115a, 120a, an insulating material 110 for intercepting an external heat being positioned between the casing 105 and the first and second storage tanks 115, 120; the lower storage tank 125 disposed below the first and second upper storage tanks 115, 120; and a driving chamber 145 including a compressor 135 disposed at the rear of the lower storage tank 125 for compressing refrigerants and a control unit 140 for controlling the operational state of the compressor 135 according to an operational signal from an operating unit 185. The driving chamber 145 is separated from the lower storage tank 125 by a sidewall 150.

Here, the first and second storage tanks 115, 120 are opened by the doors 116, 118 that are slidably disposed at the upper portion of the casing 105. The lower storage tank 125 is slidably drawn to the front of the casing 105 along a guide box 155, and opened.

As shown in the partially enlarged view of FIG. 4, in order to slide the lower storage tank 125, grooves are formed at the side of the guide box 155 and protrusions 125b slidably moved along the grooves are formed at the side of the lower storage tank 125.

An evaporator pipe 160 through which the refrigerant gas from the compressor 135 flows is coiled around the outer circumferential surfaces of the first and second storage tanks 115, 120. Heaters 165, 165' for ripening kimchi in the first and second upper storage chambers 115a, 120a are coiled around the lower portion of the evaporator pipe 160. In addition, the evaporator pipe 160 is also coiled around the outer circumferential surface of a guide box 155 surrounding the lower storage tank 125.

Here, three temperature sensors 170, 175, 180 for respectively sensing a temperature of the storage chambers and transmitting it to the control unit 140 are adhered to the evaporator pipe 160 winding around the outer circumferential surfaces of the first and second upper storage tanks 115, 120 and the lower storage tank 125.

Also, solenoids S1, S2, S3 are disposed at the kimchi storage device 100 in order to control the refrigerants supplied to the evaporator pipe 160 winding around the outer circumferential surfaces of the three storage tanks 115, 120, 125. The solenoids S1, S2, S3 are opened and shut under the control of the control unit 140, thereby varying a passage of the refrigerants. Here, the first and second solenoids S1, S2 respectively control the refrigerants supplied to the evaporator pipe 160 winding around the first and second upper storage tanks 115, 120, and the third solenoid S3 controls the refrigerants supplied to the evaporator pipe 160 winding around the lower storage tank 125.

Therefore, kimchi ripened according to the user's taste may be separately stored in the three storage chambers 115a, 120a, 125a. The three storage chambers 115a, 120a, 125a may be divided into a ripening unit and a storage unit.

Figure 6:
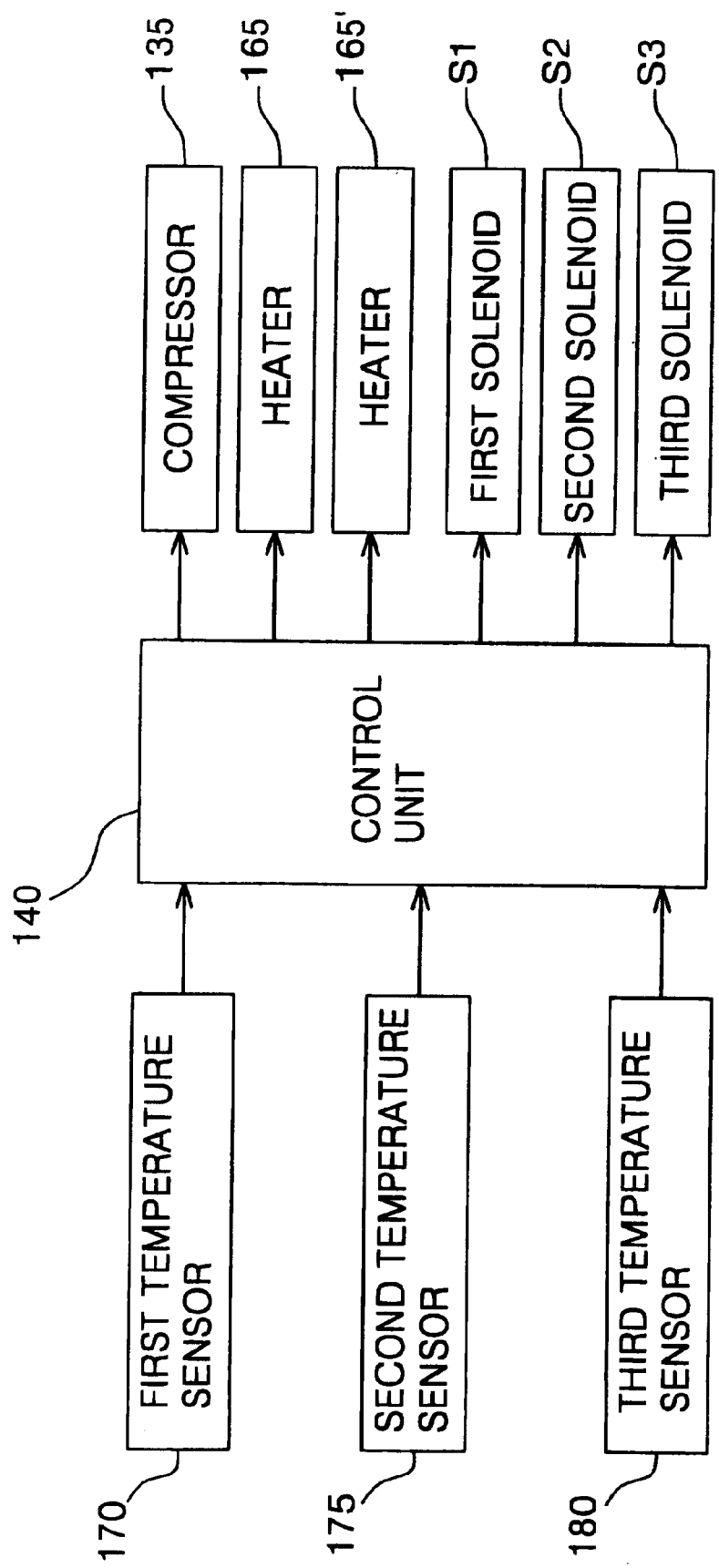
FIG. 6 is a circuit view illustrating the compound type kimchi storage device in accordance with the present invention.

FIG. 6 is a circuit view illustrating the compound type kimchi storage device in accordance with the present invention. In the case that the first upper storage chamber 115a disposed at the upper portion of the kimchi storage device 100 is used as the ripening unit, the kind and ripening degree of kimchi are set by operating the operating unit 185. Accordingly, the heater 165 is operated, the temperature of the first upper storage chamber 115a is raised, and thus kimchi starts to be ripened. At this time, the compressor 135 and the heater 165' of the second upper storage tank 120 are not operated.

For instance, when kimchi that is ripened is refrigerated in the second upper storage chamber 120a, a wanted temperature is set by operating the operating unit 185. As a result, the control unit 140 drives the compressor 135, intercepts the refrigerants supplied to the first upper storage chamber 115a and the lower storage chamber 125a by turning off the first and third solenoids S1, S3, and at the same time supplies the refrigerants merely to the evaporator pipe 160 of the second upper storage chamber 120a by turning on the second solenoid S2, thereby refrigerating the foods.

As described above, the lower storage chamber 125a is provided in the slide open/shut type lower storage tank 125 in accordance with the present invention. Therefore, the lower storage chamber 125a may be maintained at a different temperature from the upper storage chambers 115a, 120a according to the ripening level of kimchi. If necessary, vegetables or fruits can be freshly stored.

That is, when the inside temperature of each storage chamber 115a, 120a, 125a is suitably set by operating the selection button provided in the operating unit 185, the amount of the refrigerants supplied to the evaporator pipe 160 winding around the outer circumferential surfaces of the storage chambers 115, 120, 125 is varied according to the open/shut state of the solenoids S1~S3 operated by the control signal from the control unit 140. As a result, the respective storage chambers 115*a*, 120*a*, 125*a* may be maintained at different temperatures.

The first to third temperature sensors 170, 175, 180 respectively sense the temperature of the storage chambers 115*a*, 120*a*, 125*a* and transmit it to the control unit 140. Accordingly, the control unit 140 turns on/off the first to third solenoids on the basis of the temperature, thereby controlling the amount of the refrigerants supplied to the evaporator pipe 160. Thus, the temperature of the storage chambers 115*a*, 120*a*, 125*a* is maintained within a range of the design temperature.

In accordance with the present invention, the kimchi storage device includes two upper storage chambers at its upper portion and one lower storage chamber at its lower portion. The user can suitably set the temperature of the respective storage chambers according to his/her taste, and thus enjoy various tastes of kimchi. In addition, the noise generated from the driving chamber is intercepted by the lower storage chamber.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A kimchi storage device for ripening and refrigerating foods such as kimchi by selectively operating a compressor and a heater, comprising:

a casing composing an outward form of the device;

at least one upper storage tank disposed at the inside of the casing for providing at least one upper storage chamber, an insulating material being filled between the casing and the storage tank;

a door disposed at one side of the casing for opening and shutting the upper storage chamber;

a slide open/shut type lower storage tank disposed below the upper storage tank for providing a lower storage chamber, a sidewall being positioned between the upper and lower storage tanks; and a driving chamber positioned adjacently to the lower storage tank, a compressor being installed in the driving chamber.

2. The device according to claim 1, wherein the lower storage tank is installed to be slidable along a guide box disposed at an internal insulating material of the casing.

3. The device according to claim 1, wherein an evaporator pipe into which the refrigerants are inputted according to the open state of a solenoid is coiled around the outer circumferential surface of the upper storage tank, a heater is coiled around the lower portion of the evaporator pipe, and an evaporator pipe into which the refrigerants are inputted according to the open state of a solenoid is coiled around the outer circumferential surface of the guide box winding around the lower storage tank.

4. The device according to claim 1, wherein a handle unit is formed at the upper center portion of the lower storage tank.

5. The device according to claim 2, wherein an evaporator pipe into which the refrigerants are inputted according to the open state of a solenoid coiled around the outer circumferential surface of the upper storage tank, a heater is coiled around the lower portion of the evaporator pipe, and an evaporator pipe into which the refrigerants are inputted according to the open state of a solenoid is coiled around the outer circumferential surface of the guide box winding around the lower storage tank.

6. The device according to claim 2, where a handle is formed at the upper center portion of the lower storage tank.

7. The device according to claim 3, where a handle is formed at the upper center portion of the lower storage tank.

8. The device according to claim 5, where a handle is formed at the upper center portion of the lower storage tank.

* * * * *